UNITED STATES PATENT OFFICE.

AUGUST LEOPOLD LASKA, ARTHUR ZITSCHER, AND ERNST JULIUS RATH, OF OFFENBACH-ON-THE-MAIN, GERMANY, ASSIGNORS TO THE CORPORATION OF CHEMISCHE FABRIK GRIESHEIM-ELEKTRON, OF FRANKFORT-ON-THE-MAIN, GERMANY.

VAT DYESTUFFS OF THE ANTHRACENE SERIES AND PROCESS OF MAKING SAME.

1,042,931.    Specification of Letters Patent.    Patented Oct. 29, 1912.

No Drawing.    Application filed May 14, 1912. Serial No. 697,186.

*To all whom it may concern:*

Be it known that we, AUGUST LEOPOLD LASKA, ARTHUR ZITSCHER, and ERNST JULIUS RATH, chemists and doctors of philosophy, citizens of the German Empire, and residents of Offenbach-on-the-Main, in the Grand Duchy of Hesse, Germany, with post-office addresses Wilhelmsplatz 18, Friedrichstrasse 31, and Kaiserstrasse 115, respectively, have invented new and useful Improvements in Vat Dyestuffs of the Anthracene Series and Processes of Making Same, of which the following is a specification.

Our invention relates to the manufacture and production of new vat dyestuffs of the anthracene series, which are produced by acting with oxidizing agents upon azo dyestuffs, obtained by combining β-diazo compounds of the anthraquinone series with β-amino derivatives of the anthracene series. In the first place the ortho-amino-azo dyestuff is oxidized to the pseudoazimino body; by using suitable oxidizing agents and by prolonged action thereof the anthracene radical can be oxidized to the correspondent anthraquinone derivative. The simplest representatives of these bodies have the following formulæ:

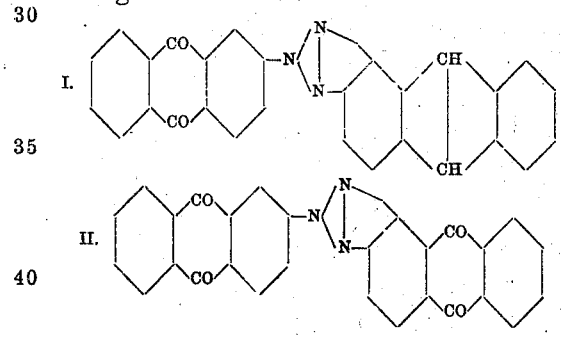

The new bodies can be used as vat dyestuffs and as intermediate products for the manufacture of dyestuffs.

The manufacture of these dyestuffs is illustrated by the following examples, the parts being by weight:

Example I: The diazo compound of 23 parts of β-aminoanthraquinone is combined with 20 parts of β-aminoanthracene in an acetic acid solution, the precipitated deep blue azo dyestuff is filtered, washed and dried. 40 parts of the azo dyestuff thus obtained are heated in 150 parts of nitrobenzene at 100° C., and are oxidized by addition of a solution of 35 parts of sodium bichromate in 200 parts of glacial acetic acid. When the blue color of the solution of the azo dyestuff is transformed into the brown-yellow color of the pseudoazimid, the reaction is stopped. Then the yellow-orange crystals which separate as the mass cools are filtered off, washed with glacial acetic acid and water and dried. The dyestuff is soluble in concentrated sulfuric acid of 66° Bé. to a brown solution, in fuming sulfuric acid to a brown-red solution, in hot nitrobenzene to a yellow solution. It is difficultly soluble or insoluble at ordinary temperature in the usual organic solvents. The dyestuff yields with a solution of alkaline hydrosulfite a deep-brown vat, which dyes cotton brown-black shades, which by oxidation and on subsequent treatment with a hot soap solution become yellow tints of very good fastness. The dyestuff has the constitution represented by Formula I.

Example II: 100 parts of the dyestuff obtained as in Example I are dissolved in 1,000 parts of concentrated sulfuric acid of 66° Bé., are precipitated with 2,000 parts of ice and to this mass 100 parts of pulverized potassium bichromate are gradually added at 90–100° C. After boiling the mixture for two hours, it is filtered, the solid matter washed, dried and recrystallized from nitrobenzene, in which, when hot it is soluble to a pale-yellow solution. The body, which has the constitution represented by Formula II, forms pale-yellow needles soluble in concentrated sulfuric acid of 66° Bé. to an orange solution, in fuming sulfuric acid to a brown-orange solution. The dyestuff yields with a solution of alkaline hydrosulfite a violet vat, dyeing cotton violet shades, which when oxidized become a yellow more feeble than the yellow obtained with the dyestuff of Example I.

Example III: The azo dyestuff precipitated in the form of blackish-green flocks by combining the diazo compound corresponding with 45 parts of 2-aminoanthraquinone, with 21 parts of 2:6-diaminoanthracene, is suspended in water containing some caustic soda lye and to this mixture a solution of sodium hypochlorite is added at a temperature of 100° C. until the black color is transformed into a yellowish-red. The oxidation product thus obtained (which contains probably two anthraquinone nuclei and one anthracene complex) is filtered, washed and used in the form of paste for dyeing. The dyestuff forms when dry a brownish powder soluble in concentrated sulfuric acid of 66° Bé. to a brown-yellow solution, in fuming sulfuric acid to a brown solution. From the violet-brown vat cotton is dyed black-brown shades which on subsequent oxidation and treatment with a hot soap solution becomes reddish-yellow of very good fastness.

Example IV: 50 parts of the dyestuff obtained as in Example III are mixed with 250 parts of glacial acetic acid; to this mixture is added a solution of 50 parts of sodium bichromate in 250 parts of glacial acetic acid, and the whole is boiled while gradually 30 parts of concentrated sulfuric acid are dropped in. After boiling two hours the mixture is poured into water, the precipitated dyestuff (which contains probably three anthraquinone nuclei) is filtered, washed and dried. It forms a brownish powder soluble in concentrated sulfuric acid of 66° Bé. to an orange solution and in fuming sulfuric acid to a brown-orange solution. From the violet-brown vat cotton is dyed deep brown shades which on subsequent oxidation become yellow of very good fastness.

Now what we claim and desire to secure by Letters Patent is the following:

1. The process of manufacturing vat dyestuffs of the anthracene series consisting in acting with oxidizing agents upon azo dyestuffs of the general formula:

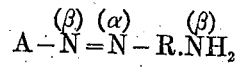

wherein A means an anthraquinone radical and R an anthracene radical.

2. As a new article of manufacture a vat dyestuff obtained by oxidation of the azo dyestuff from β-diazoanthraquinone and β-aminoanthracene indicated by the formula

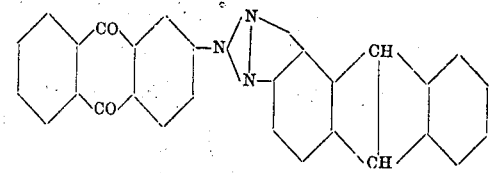

which dyestuff dissolves in concentrated sulfuric acid to a brown solution, in hot nitrobenzene to a yellow solution and yields with alkaline hydrosulfite solution a deep-brown vat from which cotton is dyed brown-black shades, which by oxidation and treatment with a hot soap solution become yellow of very good fastness.

In testimony, that we claim the foregoing as our invention, we have signed our names in presence of two witnesses, this 27th day of April, 1912.

AUGUST LEOPOLD LASKA.
ARTHUR ZITSCHER.
ERNST JULIUS RATH.

Witnesses:
PETER LAUTENSCHLÄGER,
FRITZ DÉSOR.

---

Copies of this patent may be obtained for five cents each, by addressing the "Commissioner of Patents, Washington, D. C."